United States Patent
Boswell, Jr. et al.

[15] 3,664,036
[45] May 23, 1972

[54] AUDIO-VISUAL TEACHING DEVICE AND METHOD FOR INSTRUCTION IN THE OPERATION OF KEYBOARD CONTROLLED INSTRUMENTS

[72] Inventors: John E. E. Boswell, Jr.; Jesse H. Miner, both of Falls Church, Va.

[73] Assignee: Arthur R. Schmoyer, Potomac, Md.

[22] Filed: Oct. 13, 1970

[21] Appl. No.: 80,354

[52] U.S. Cl. ..................................................35/6, 35/8 A
[51] Int. Cl. ..................................................G09b 13/02
[58] Field of Search ..........................35/5, 6, 8, 9; 84/478; 179/100.1

[56] References Cited

UNITED STATES PATENTS

| | | | |
|---|---|---|---|
| 3,482,480 | 12/1969 | Decker | 35/9 X |
| 3,377,716 | 4/1968 | Schmoyer | 84/478 |
| 3,552,256 | 1/1971 | Soanes | 35/6 |
| 3,222,597 | 12/1965 | Beatenbough et al. | 35/8 X |

FOREIGN PATENTS OR APPLICATIONS 238,912  3/1969  U.S.S.R. ......................................35/5

*Primary Examiner*—Robert W. Michell
*Assistant Examiner*—J. H. Wolff
*Attorney*—Smith, Michael, Bradford & Gardiner

[57] ABSTRACT

An apparatus for teaching the operation of a keyboard instrument comprises audio and visual components actuated respectively by voice signals and cueing signals both recorded at audio frequencies on a single "track" of magnetic medium. The cueing signals are superimposed on an audio inhibit signal of a preselected frequency which may or may not be within audio range and which is effective through a filter network to switch the apparatus from an audio mode to a visual mode in advance of the cueing signals and to maintain the apparatus in the visual mode during decoding of the cueing signals. Alternatively, cueing signals of brief duration are used to trigger a latching circuit to hold a visual indicator activated while further audio instructions are reproduced, and a subsequent cueing signal serves to unlatch the circuit to terminate the visual indication.

7 Claims, 4 Drawing Figures

INVENTOR.
JOHN E.E. BOSWELL, Jr.
JESSE H. MINER
BY
Smith, Michael, Bradford & Gardiner "In Time With The Light Ready Start —"W"————"e"————"

"———Depress And Hold The Key "c"———One, Two,———Now"

INVENTORS
John E. E. Boswell, Jr.
Jesse E. Miner

BY *Smith, Michael, Brodford & Gardiner*
ATTORNEYS

3,664,036

AUDIO-VISUAL TEACHING DEVICE AND METHOD FOR INSTRUCTION IN THE OPERATION OF KEYBOARD CONTROLLED INSTRUMENTS

ENVIRONMENT OF INVENTION

This invention relates to the field of audio-visual teaching apparatus, and is particularly applicable to a device for teaching the operation of a keyboard controlled instrument, such as a typewriter, key punch machine, calculator, piano or organ, wherein the apparatus is activated by a pre-recorded magnetic program including both audio instructions and cues for operation of visual displays.

BACKGROUND OF INVENTION – PRIOR ART

Apparatus of the aforementioned type has been suggested wherein a program of audio instructions and cueing signals for the visual components are pre-recorded on a magnetic medium which is played back on the teaching apparatus. The apparatus detects both audio instructions and cueing signals, reproducing the instructions in audible form, and utilizing the cue signals to activate appropriate visual displays. One such apparatus is disclosed in U. S. Pat. No. 3,377,716, issued Apr. 16, 1968 to Arthur R. Schmoyer. In the apparatus of the Schmoyer patent, it is necessary to maintain a separation of the recorded signals so that they can be read out and reproduced separately, each through its respective read-out head, in order to avoid objectional interference with the audio instructions by feed through of the cueing signals and possible false triggering of the visual displays by audio notes which may coincide in frequency with a particular cue signal. The latter is a particular problem where the apparatus is used in teaching a musical instrument of a sustained note type, such as the organ.

Audio-visual apparatus has also been designed wherein the audio instructions and cue signals are recorded on a single track, as in U. S. Pat. No. 3,227,814, issued Jan. 4, 1966 to Warren S. Ferris et al, and in U. S. Pat. No. 3,482,480 issued Dec. 9, 1969 to Tom W. Decker. Such apparatus finds principal application where a visual apparatus such as a slide changer is actuated in only one manner (i.e., to change to the next successive slide) so as to require a cueing signal bearing only a single characteristic. In such instances no intricate decoding problems are involved so that a frequency slightly outside of the audio range can be utilized or a cueing signal frequency is selected in the audio range. A single audio cueing signal can be tolerated by the listener, and decoding circuitry can be adopted which presents relatively little risk of false triggering, as by requiring the signal to persist for a minimum time period.

It has further been suggested in the didactic environment to place three categories of signals on a single track of recorded tape. Thus, in U. S. Pat. No. 3,222,597, issued Dec. 7, 1965 to C. M. Beatenbough et al, audio instructions are interspersed with sub-audible signals which function to arrest further operation of the tape deck, thus providing an interval in which the student is expected to perform the act indicated in the preceding audio instruction. If his performance is correct, tape movement is re-established through external connections and a second audio frequency signal which is superimposed on the subaudible recording is audibly reproduced to apprise the listener of his successful performance.

OBJECTS OF INVENTION

The apparatus of the aforedescribed prior art suffers from either of two deficiencies, namely it is unduly complicated or it is limited in its application to apparatus involving a minimal number of diverse cueing read-outs. In contradistinction to the above, this invention has as its principal object the provision of an apparatus which utilizes a pre-recorded program including audio instructions and a virtually unlimited number of audio-frequency cues for activation of a video display without incurring interference between the two. In addition to the aforementioned advantage, this invention has as its objects the provision of a programmed audio-visual teaching device in which:

1. a single track of a pre-recorded program is utilized for audio and visual activation,
2. interference between audio and visual intelligence is avoided,
3. the quantity of diverse characteristic cue signals is virtually unlimited,
4. recording of the program is simplified,
5. the apparatus may be adapted to momentary or to sustained visual displays, and
6. a rhythm for student performance is carried through both audio and visual modes of operation.

DESCRIPTION OF DRAWING

These and other self-evident advantages will be better understood by a consideration of the ensuing specification and the accompanying drawings, in which.

DESCRIPTION OF THE APPARATUS

Figure 1:
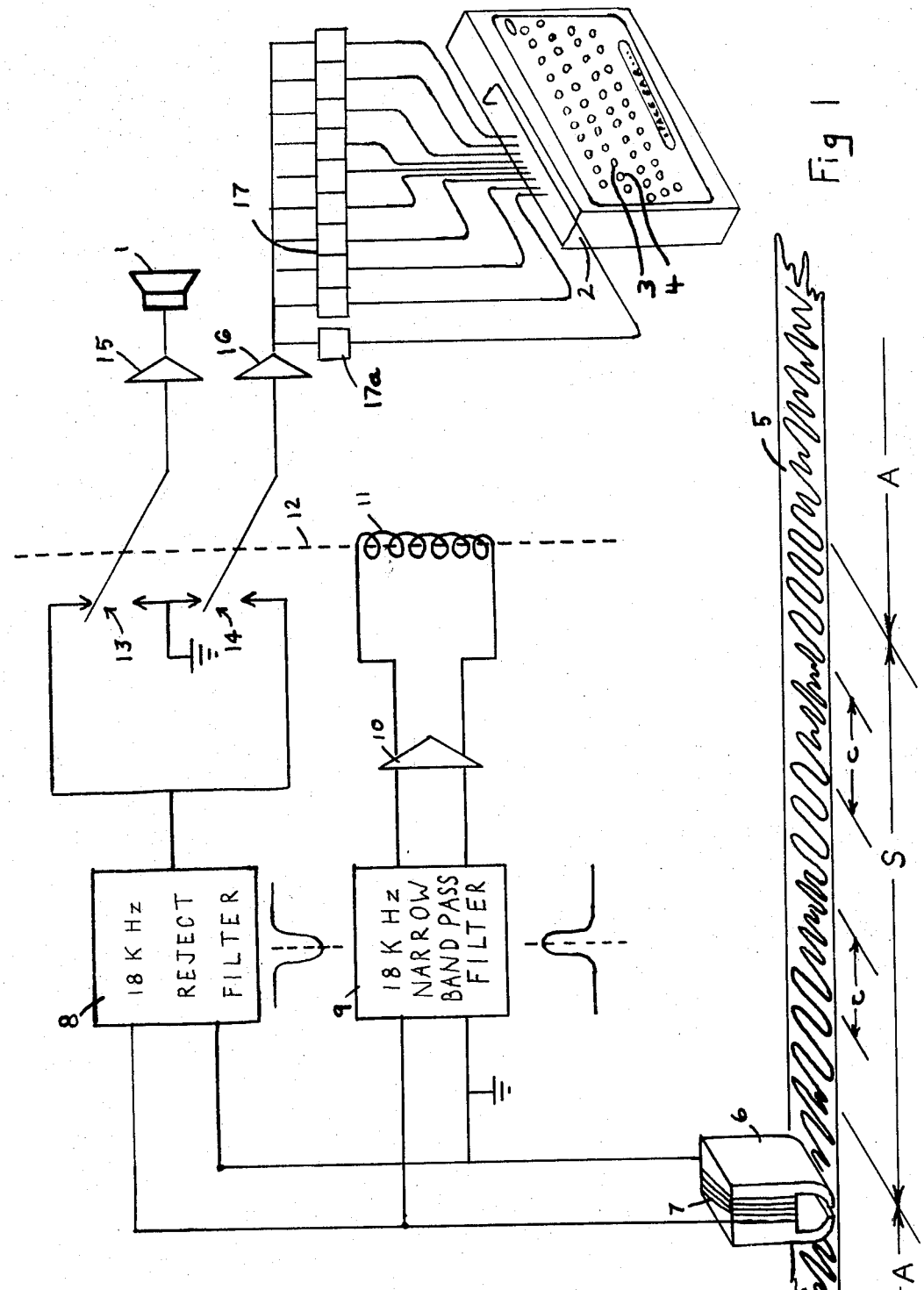
FIG. 1 illustrates a preferred embodiment of the invention and which represents schematically the recorded program together with a block diagram of the system components.

The teaching apparatus of this invention conveys intelligence to a student by both audio and visual means. The audio means is represented in the drawing by loudspeaker 1 and the visual means by display panel 2 including indicator lights 3, 4, etc. on the face thereof. The illustrated embodiment is a display for a typewriter keyboard in which light 3 designates a key such as for the letter "e" and the light 4 designates a key, such as for the letter "w." In certain types of teaching apparatus, these means might appropriately take forms other than those shown, such as earphones and indicator lights associated with individual keys of a keyboard as is well known in the art.

Activation of the audio and visual means is accomplished in response to a program which is pre-recorded, as on a magnetic tape 5. The apparatus includes a conventional tape transport (not shown) for moving the tape along a predetermined path to pass a reproducing head 6 including a pickup coil 7.

One form of pre-recorded program for use in practicing this invention includes as many as four forms of intelligence recorded in sequence along a single "track" falling within the path of tape transport, the forms being identified in the drawing as:

"A" – audio intelligence comprising instructions recorded at audio frequencies for reproduction over speaker 1, "S" – a switching signal of a predetermined frequency (e.g. 18 KHz) effective to switch the apparatus from an audio mode to a visual mode, "C" – cueing signals comprising audio frequencies superimposed on the switching signals for the purpose of controlling the visual display 2, and "cc" – a plurality of simultaneously occurring "C" signals.

For convenience in the ensuing specification, these signals will be referred to as identified above, namely "A" signals, "S" signals, "C" signals, and "cc" signals.

The output of the pickup coil 7 is fed to the inputs of both filters 8 and 9. Each of these filters is centered on a frequency which has been selected as the S signal frequency, chosen in the illustrated embodiment as the frequency of 18 KHz. Other frequencies, either within or outside of the audio range may be chosen, a frequency of 5.4 KHz being preferred where tape cassettes are employed because of the limited frequency range thereof. Filter 8 is a narrow band-reject filter which functions to pass all frequencies except the 18 KHz S signal. On the other hand, filter 9 is a narrow-band-pass filter designed to reject all frequencies except 18 KHz. Hence, it can be seen that filter 8 will pass signals A and C whereas filter 9 will pass only signal S.

The signal S output of filter 9 is coupled, through amplifier 10, to the control element of a switching device illustrated as a relay comprising coil 11 and an armature represented schematically at 12 as operably related to ganged contact sets 13 and 14.

A or C signals, once passed by filter 8, are applied to a fixed contact of each of the contact sets 13 and 14 which serve to route those signals to either the audio or the visual means 1 or 2. The relay coil 11 is shown in the drawing as being de-energized, in which instance the output circuit of filter 8 is completed through contact set 13 to route the signal through amplifier 15 for audible reproduction in loudspeaker 1. In this condition, referred to in the claims as the audio mode, the input to amplifier 16 is grounded through contact set 14, thus disabling all video circuit response and avoiding flashing of the visual display which might otherwise occur in response to spurious occurrences of triggering frequencies within the audio signals. When energized to the video mode, relay coil 11 is effective to open the circuit between filter 8 and amplifier 15, thus muting the audio means including speaker 1. Moreover, contact set 14 is closed to route the output of filter 8 through amplifier 16 to a decoder 17. Decoder 17 is of a conventional form (see the aforementioned U.S. Pat. No. 3,377,716) comprising a plurality of selected frequency-responsive elements, each responsive to its characteristic frequency to activate a particular visual indicator. By the use of decoder elements responsive to a combination of two or three selected frequencies, a sufficient number of codes can be established for a typewriter instructional display (55 codes) by the use of only 10 selected frequencies.

METHOD AND OPERATION

The operation of the invention can be readily understood by considering a sequence in the instructional program which takes place after the student has completed preliminary learning of the basic positions of keys and fingers to be used in striking those keys. The manner of use of this apparatus in this preliminary learning will become self-evident after considering the operation of the device in the method of more advanced teaching.

Following preliminary learning, there comes a time when it is desirable to have the student manipulate, or strike the keys in a predetermined rhythm. To this end, a timing signal is established which maintains this predetermined rhythm on both the audio and visual portions of the tape. The recurrence rate of these signals is, in a preferred method, three times the frequency at which the keys are to be struck, the strike beat appearing as a visual display (with or without an accompanying audio beat) and the intervening rhythm beats being presented audibly. Thus, the strike beat, by which the student's performance is demanded, is distinguished from the intervening rhythm beats which serve to maintain the rhythm during instructional commands.

This is accomplished by recording the respective signals on the tape in the following sequence, reference being made to FIG. 2 which presents in diagrammatic form a waveform representation of the program. Initially, voice instructions, generally indicated at 20, will inform the student that he will hear an instructional command identifying a key to be struck, and that this command will be given simultaneously with a first audible (e.g., metronome) beat. He is further informed that an indicator corresponding to this key will light upon the occurrence of a second metronome beat, and that a "strike light" on the display will then be activated in time with the metronome beats to indicate the moment at which he is to strike the key. Having received this information he is instructed to " . . . listen for the command on the first beat, locate the key on the second beat, and strike the key in time with the light, ready, start . . ."

Figure 2:
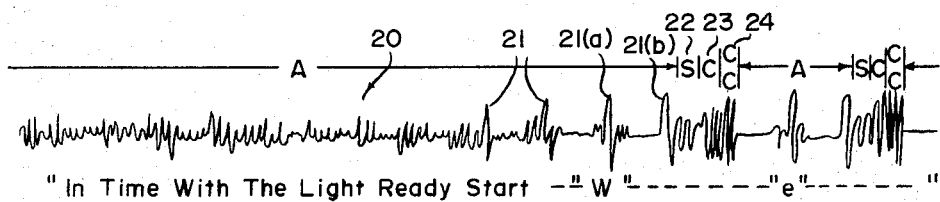
FIG. 2 is a more detailed diagram of a recorded program for use in conjunction with instruction in momentary operation of keys.

During the latter part of these instructions, the rhythm is established by commencement of the audible metronome beat, signified in FIG. 2 by the high amplitude alternations 21. On the occurrence of metronome beat 21($a$), the first instructional command is given, as by audibly commanding "$w$." Following a slight pause, determined by the recurrence rate of the rhythm chosen as appropriate to the student's skill at this point in his instruction, a second metronome beat 21($b$) is reproduced.

Up to this point, the program has consisted of signals A, i.e. voice frequencies. These signals are blocked by filter 9 and passed in their entirety (except for the negligible narrow band of the S signal frequency) by filter 8. Relay 11 has remained de-energized so that the apparatus has remained in the audio mode wherein the signal has been routed to the audio amplifier 15 and reproduced in speaker 1.

Once the audible instruction is complete and the second metronome beat 21($b$) has been sounded, the portion of the tape comprising the S signal 22 of 18 $K_z$ commences to pass the head 6, and is reproduced and presented to both filters where it is rejected by filter 8 and passed by filter 9. The output of filter 9 is amplified at 10 to activate the relay 11, thus switching the apparatus from the audio mode to the visual mode in which the audio means 1 is muted by virtue of the grounding of its input by contact set 13 and any signal appearing at the output of filter 8 is fed to the decoder 17 for visual reproduction. Inasmuch as filter 8 rejects only 18 $KH_z$ signals, the visual control circuit remains receptive to all other frequencies within the capacity of the reproducing equipment (i.e., head, amplifier, etc.). Thus, the entire audio spectrum and bordering subaudible and superaudible ranges (except 18 $KH_z$) are available for use in providing cueing signals to be decoded for control of the visual display. In practice, it has been found necessary to use only the range of 100 to 400 $H_z$ in order to provide the number of cues necessary for the operation of displays for teaching devices for keyboards such as the typewriter or organ, but the versatility of the device is greatly enhanced by this wide range of available frequencies.

With the apparatus now in the visual mode, continued movement of the tape brings into registry with the reproducing head 6 the third, or C signal 23, which comprises a cueing signal consisting of a sustained audio note other than 18 $KH_z$ (or combination of such notes) superimposed on the 18 $HK_z$ signal. The 18 $KH_z$ signal serves to maintain relay 11 energized and thus to hold the apparatus in the visual mode wherein the audio means 1 is muted and all signals passed by filter 8 are fed to decoder 17. Thus, the cueing signals are passed to the decoder for activation of the appropriate visual display. At this point, just prior to the third beat of a rhythm series for one key, the student has received the audible command "$w$" coincident with a metronome beat and a visual indication of the location of the key "$w$" which commenced immediately following a second metronome beat.

Further movement of the tape 4 brings signal 24 into registry with the reproducing head 6. This signal, designated "$cc$," comprises a continuation of recorded signals 22 and 23 with the superimposition of an additional cueing signal effective to activate a particular decoder 17 which in turn operates to momentarily illuminate the strike light 25, this "$cc$" signal being positioned upon the tape so as to occur in read-out at the appropriate position in time as established by the audible metronome and yet distinguished therefrom by virtue of its visual characteristic.

Summarizing the operation as presented to the student, a rhythm is established comprising 3 beats for each strike of a key. The first two beats are preparatory and are audio beats, the third beat being a command for action, i.e., to strike the key, is distinguished from the first two by being presented visually. Thus, the sequence is as follows:

First, on audible beat—audible instruction as to key to be struck,

Second, on audible beat—visual instruction as to location of key, and

Third, by a visual beat—action command to strike the key.

Figure 3:
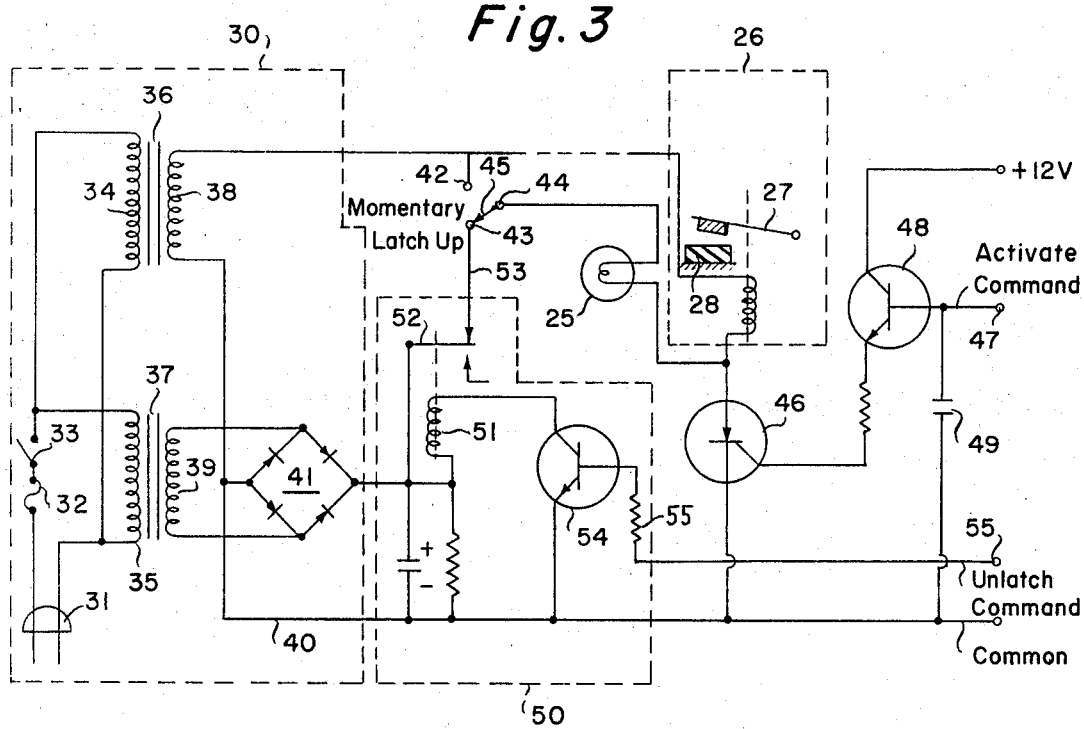
FIG. 3 is a schematic diagram of the indicator activating circuit.

While the establishment of a rhythm wherein the third beat is distinguished from the first two notes in the series for each key is desirable, it is also desirable to maintain continuity of the rhythm in the audible mode. To this end, the activation of the strike light may be accomplished by means of a relay (not shown) or a supplemental solenoid 26 (FIG. 3) may be provided in order to produce an audible beat simultaneously with the flash of the strike light. This beat will inherently vary in its sound characteristic from that of the pre-recorded metronome beat and thus, in combination with the visual strike light, be clearly distinguishable from the first two beats while still maintaining an audible continuity of the beat recurrence frequency. In a preferred embodiment, this solenoid may include an armature 27 in the form of a hammer which registers with a sounding block 28 constructed of hard rubber so as to resemble the sound of a typewriter key striking the platen. With this type of sounding device, the student can easily determine when his action of striking the key corresponds precisely in time with the strike beat of the teaching device inasmuch as the sound of his typewriter key and that of the solenoid will sound as a single beat when in coincidence. In FIG. 3, the connection of the solenoid 26 across the indicator 25 is indicated in dotted lines to signify that its presence is optional, and that it is only used in the circuit wherein the indicator 25 is the "-strike" light.

It will be noted that the aforedescribed device is operable in two modes, i.e., audio or visual, and that each is exclusive of the other. Hence, no reproduction of recorded audio is possible while a visual display is activated, and no visual display is possible while reproduction of recorded audio instructions is taking place. This characteristic of operation is well adapted to instruction in the operation of a keyboard controlled instrument such as the typewriter which is operated primarily by momentary key actuation, thus requiring only short periods of activation of the individual indicators on the visual display 2. In the case of a keyboard controlled apparatus where keys are depressed for longer periods of time, as in a sustained note musical instrument such as the organ, it is desirable that a visual indication remain activated for the duration of the sustained period of key actuation, and that the device be capable of returning to the audio mode of reproduction while maintaining that particular visual indication. To this end, provision is made for first latching an indicator in the activated condition while the balance of the circuitry returns to the audio mode for additional audio commentary, and subsequently momentarily switching back to the visual mode to unlatch, or extinguish, the visual indication.

For an understanding of the manner in which the apparatus can function in either the momentary or latch-up activation of the video display, reference is again made to FIG. 3 which depicts schematically a control circuit for a single indicator light. The circuit comprises a power supply generally indicated at 30. The power supply receives power from a conventional 115 V. A.C. source as through connector 31 and applies the A.C. power through fuse 32 and switch 33 to the paralleled primary windings 34 and 35 of transformers 36 and 37 respectively. Transformer 36 supplies an A.C. voltage through its secondary 38 between the common conductor 40 and contact 42 of the manual selector switch 45. On the other hand, transformer 37 supplies, through its secondary 39 and a full wave rectifier 41, a D.C. voltage between common conductor 40 and contact 43 of the selector switch 45. From this switch, either the A.C. voltage or the D.C. voltage is fed from its respective contact 42 or 43 through the movable contact and terminal 44 to the indicator circuit comprising indicator 25 and silicon controlled rectifier 46 which serves as a control means for activation of the indicator 25. By this means, the series circuit of the indicator 25 and SCR 46 is supplied with A.C. when manual selector switch 45 is in the momentary position, and with D.C. when in the latch-up position.

It is well known characteristic of the silicon controlled rectifier that once fired by the application of a triggering voltage to the control electrode, or gate, the rectifier will remain conducting until there is a reversal of polarity of the voltage across the cathode and anode electrodes, or until the voltage is removed therefrom. Hence, when the voltage applied across cathode and anode electrodes is A.C., the SCR will remain conducting only so long as the triggering potential is applied to the gate electrode, for on the next alternation of the A.C. voltage following removal of the triggering potential the cathode-anode voltage is reversed in polarity, thus extinguishing conduction. On the other hand, when the applied voltage is D.C., the SCR will, once triggered, remain in the conducting state until some external circuit means is utilized to remove or reverse the applied potential.

Returning to a consideration of FIG. 3, it is now evident that an activate signal received from decoder 17 at terminal 47 is applied, through impedance matching transistor 48, to the gate electrode of SCR 46 to fire the same and thus activate indicator lamp 25. Capacitor 49 serves as a limited time delay to avoid triggering in response to spurious noise signals introduced into the circuit by means other than the activate signals "C." Resistor 55 is a current limiting resistor for the gate circuit, a value of 1K being appropriate to limit the current to 10 MA. With selector switch 45 in the momentary position, and A.C. applied through contact 42 to activate the lamp, SCR 46 will remain conductive only so long as a triggering potential is supplied to its gate from transistor 48, or while an activate command is supplied to terminal 47 from its associated decoder 17 as it responds to its cueing signal "C." Upon cessation of the signal "C," decoder 17 is deactivated, the triggering potential removed from the gate of SCR 46, and conduction in the circuit including lamp 25 ceases upon the next succeeding reversal of the A.C. wave, thus extinguishing lamp 25. Thus, operation when selector switch 45 is in the momentary position is as previously described in connection with the typewriter.

In operation for a sustained note instrument keyboard, selector switch 45 is moved to the latch-up position to apply through contact 43 a D.C. potential to the series circuit including indicator 25 and SCR 46. Firing of SCR 46 takes place in the same manner as before, except that once fired, the SCR now remains conductive under the influence of its D.C. applied voltage despite the removal of the triggering voltage from its gate. Hence, the activate command can be a very brief impulse, the duration of which need only overcome the brief time delay of capacitor 49. Following this brief impulse, the apparatus is free to operate in the audio mode while the selected indicators 25 remain illuminated.

In order to terminate conduction of SCR 46 when illumination of indicator lamp 25 is no longer desired, it becomes necessary to remove the cathode-anode potential on the SCR. To this end, an unlatch circuit 50 is provided. This circuit includes a relay comprising solenoid 51 and normally closed contacts 52, 53 interposed between the D.C. voltage source 41 and the indicator circuit. Solenoid 51 is normally deactivated by virtue of the normally non-conductive condition of transistor 54. When it is desired to extinguish the "latched-up" indicator 25, a preselected cueing signal is applied to decoder 17a to activate a frequency-responsive element designated for that purpose, the output of which is fed to the unlatch command terminal of the unlatch circuit for each indicator. Receipt of this signal biases amplifying transistor 54 into conduction to energize relay 51, opening contacts 52, 53 to remove the D.C. potential of source 41 from the indicator circuit. SCR 46 ceases conduction, lamp 25 is extinguished, and, upon cessation of the unlatch command which again need be of only brief duration, the circuit stands ready for the next activate command.

It should be apparent that the circuit for activating the "-strike" light, which may include solenoid 26 operates always in a momentary manner in which instance the selector switch 45 and unlatch circuit 50 may be eliminated.

In view of the extremely brief duration of the impulses necessary to activate and to later extinguish illumination of the selected indicators, the apparatus of FIG. 1 can be switched from audio mode to visual mode for such a short interval that the switching can be accomplished during normal pauses in the voice signals, as between sentences or phrases. Moreover, in programming the apparatus of this invention, it has been found that such pauses usually coincide with the appropriate time for activation and for extinguishment of an indicator, and thus are not noticeable in the audio read-out. It is apparent also that where the apparatus of this invention is to be used exclusively in instruction for a sustained note instrument, the A.C. supply and selector switch of FIG. 3 may be eliminated and/or the filter circuits and switching of FIG. 1 may be dispensed with. In the latter instance, the cueing signals would be reproduced in the speaker 1 but may be tolerated because of their brief duration and the fact that sustained note instruments involve fewer different cues of less frequent occurrence.

Figure 4:
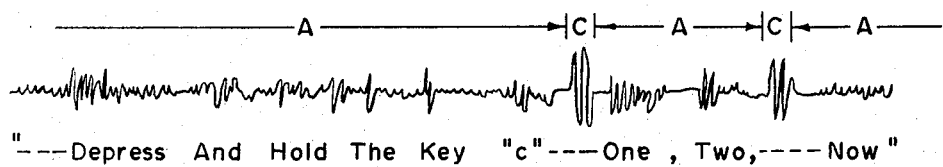
FIG. 4 is a diagram of a recorded program for use in conjunction with instruction in sustained operation of keys.

Summarizing the operation of the apparatus in the latch-up setting of the selector switch, and with special reference to FIG. 4, the program comprises "A" signals in the nature of audio instructions 60 which apprise the student of the key or keys to be manipulated. At the conclusion of these instructions a "C" signal 61 including a brief impulse including a tone having a frequency or a mixture of frequencies which serve to trigger the decoder and indicator for the particular key or keys. As explained in the preceding paragraph, this C signal may or may not include the S signal of 18 KH$_z$, depending on the particular embodiment of the apparatus which is being used. Immediately following this brief impulse, additional audio instructions 62 may be reproduced while the indicator or indicators remain illuminated, followed by another brief impulse 63 of C signal including the frequency of the unlatch decoder, thus extinguishing the indicators and readying the apparatus for further audio instructions 64.

From the foregoing description, it can be seen that the apparatus and method disclosed comprise an invention which is quite versatile in its application to various keyboard instructional procedures, the specific procedures and apparatus being described for exemplary purposes only and not in the way of limitation of the scope of the inventive concepts involved, the latter to be determined by a consideration of the following claims:

We claim:

1. A method of instructing a pupil in the operation of a machine including a keyboard, said method including the steps of:
   A. providing audio-visual means comprising audible reproduction means and a visual display discernible to a pupil positioned at said keyboard,
   B. programming in a single track on an elongated record medium a sequence comprising audio frequency instructional information signals, a switching signal, and audio frequency cues for actuating said visual display to indicate to said pupil a response being solicited in his manipulation of said keyboard,
   C. continuously reading out the entirety of said sequence and
      a. processing said instructional information signals for reproduction by said audible reproduction means,
      b. processing said cues for activation of said visual display,
   D. normally maintaining one of said recited audio-visual means in an enabled state while maintaining the other in an inhibited state,
   E. applying said switching signal to switching means coupled to each said audio-visual means to enable said other and inhibit said one of said processing operations,
whereby said instructional method operates at any given time in an audio reproduction mode or in a visual display change mode, each to the exclusion of the other.

2. The method set forth in claim 1 wherein the steps of application of the switching signal to said switching means enables processing of the cues to activate the visual display and disables processing of the instructional information to thus mute audible reproduction and wherein the programmed sequence includes a second switching signal and a cue having a characteristic distinguishable from that of other cues, said method comprising the following additional steps which commence with the cessation of said first recited switching signal:
   F. returning said switching means to its original state while
   G. maintaining said visual display in said activated state,
   H. processing an audibly reproducing further instructional information while maintaining said visual display activated,
   I. upon completion of processing and reproduction of said further instructional information applying the second switching signal of said sequence to said switching means to again enable processing of cues and mute audible reproduction, and
   J. processing said distinguishable cue to deactivate said visual display.

3. An apparatus for instructing a pupil in the operation of a keyboard controlled machine, said apparatus comprising:
   A. audio reproduction means and visual display means disposed in positions sufficiently proximate to said keyboard to be discernible to a pupil positioned thereat so as to indicate to said pupil a response being solicited in his manipulation of said keyboard,
   B. an elongated record medium having pre-recorded in a single track therealong a program including a sequence of audio frequency instructional information signals, switching signals, and audio frequency cues for actuating a visual display,
   C. means operating continuously through said sequence for reading said program from said single track of said medium,
   D. switching means
      a. coupled to said reading means and actuated by switching signals derived therefrom and
      b. operatively connected to said audio reproduction means and to said visual display means to enable one and inhibit the other of said reproduction and display means and effective upon said actuation being said switching signal to inhibit said one and enable said other of said reproduction and display means,
whereby said instructional apparatus operates at a given time in an audio reproduction mode or in a visual display change mode, one to the exclusion of the other.

4. An apparatus for instructing a pupil in the operation of a keyboard controlled machine, said apparatus comprising:
   A. an elongated record medium having pre-recorded in a single track therealong a program including as components thereof audio frequency instructional information signals for audible reproduction, a switching signal, and audio frequency cues for actuating a visual display,
   B. means for reading said program from said single track of said medium,
   C. means coupled to the output of said reading means for separating said switching signals from the other components of said program, said separating means including
      a. first output means for selecting only said switching signals,
      b. second output means for said other components of said program,
   D. audio reproduction means and visual display means disposed in positions sufficiently proximate to said keyboard to be discernible to a pupil positioned thereat so as to indicate to said pupil a response being solicited in this manipulation of said keyboard,
   E. switching means
      a. operatively connected to said first output for operation by said switching signal and including
      b. switching elements interposed between said second output and the respective inputs of said audio reproduction means and said visual display means,
operation of said switching means switching said apparatus from an audio mode to a visual mode wherein audio reproduction is inhibited and the said second output of said separating means is connected to the input of said visual display means.

5. The apparatus set forth in claim 4 wherein said program includes a cue having a characteristic distinguishable from that of other cues, control circuits each associated with individual display elements of said visual display device for activation thereof, decoding means each associated with at least one control circuit and when said apparatus is in said visual mode responsive to an individual cue for initiating activation of display elements by the associated control circuits, said control circuit further including means operative to latch said control circuit in its activated state and thus sustain the activation of said display element after cessation of said individual cue, an unlatch decoding means responsive only to said distinguishable cue and operative to terminate the sustained activation of said control circuit.

6. The apparatus set forth in claim 5 wherein said control circuit includes a silicon controlled rectifier connected in normally non-conducting circuit configuration and including a gate electrode operatively connected to the output of one of said first recited decoding means, and cathode and anode electrodes connected in a series circuit comprising said display element, a source of direct current, and a terminate switch, operating means for said terminate switch connected to the output of said second named decoding means and thus responsive to said distinguishable cue to open said series circuit, said silicon controlled rectifier being responsive to the presence of a signal from said first recited decoder to switch to a sustained conducting state and responsive to the opening of said series circuit by a signal from said second named decoder to return to its non-conducting state.

7. The apparatus set forth in claim 6 including an alternating current source and means for selectively connecting only one of said current sources in said series circuit whereby said control circuit operates as set forth in claim 11 when connected to said source of direct current and, when connected to said source of alternating current activates said display element only during the presence at said gate electrode of a signal representative of said individual cue and deactivates said display element upon cessation of said signal at said gate electrode.

* * * * *